United States Patent
Madigan

(10) Patent No.: US 7,649,280 B2
(45) Date of Patent: Jan. 19, 2010

(54) METHOD AND CIRCUIT FOR CROSS REGULATION IN A POWER CONVERTER

(75) Inventor: Michael Thomas Madigan, Cary, NC (US)

(73) Assignee: Texas Instruments Incorporated, Dallas, TX (US)

( * ) Notice: Subject to any disclaimer, the term of this patent is extended or adjusted under 35 U.S.C. 154(b) by 291 days.

(21) Appl. No.: 11/902,378

(22) Filed: Sep. 21, 2007

(65) Prior Publication Data

US 2008/0073974 A1    Mar. 27, 2008

Related U.S. Application Data

(60) Provisional application No. 60/826,438, filed on Sep. 21, 2006.

(51) Int. Cl.
  H02J 3/00   (2006.01)
  G05F 1/577  (2006.01)
  H02M 3/335  (2006.01)

(52) U.S. Cl. .............. 307/17; 307/11; 307/31; 323/266; 323/267; 363/21.07; 363/21.09; 363/21.11; 363/21.15; 363/21.17

(58) Field of Classification Search ........... 307/11, 307/17, 31; 323/266–267; 363/21.04–21.18, 363/50, 55, 56.09, 56.1, 56.11
See application file for complete search history.

(56) References Cited

U.S. PATENT DOCUMENTS

| | | | | | |
|---|---|---|---|---|---|
| 5,285,367 | A | * | 2/1994 | Keller | 363/21.09 |
| 6,028,373 | A | * | 2/2000 | Kim et al. | 307/31 |
| 6,434,030 | B1 | * | 8/2002 | Rehm et al. | 363/97 |
| 7,304,867 | B2 | * | 12/2007 | Usui | 363/21.06 |
| 7,375,990 | B2 | * | 5/2008 | Muramatsu | 363/56.1 |

* cited by examiner

*Primary Examiner*—Albert W Paladini
*Assistant Examiner*—Hal I Kaplan
(74) *Attorney, Agent, or Firm*—William B. Kempler; Wade J. Brady, III; Frederick J. Telecky, Jr.

(57) ABSTRACT

A power equalization circuit in a transformer-based device having a plurality of isolated voltage outputs is provided. The circuit comprises: a threshold detection circuit configured to receive an error signal derived from a selected voltage at one of the isolated voltage outputs, and to determine whether the selected voltage is above a voltage threshold based on the error signal; a timer circuit configured to activate a wait signal after a maximum voltage drift time has expired since the selected voltage rose above the voltage threshold, and to activate a wink signal coincident with the wait signal; an overdrive current source configured to drive an error current to an overdriven value in response to the wait signal; and a commutator circuit connected to a transistor winding associated with the selected isolated voltage output, the commutator being configured to connect a transformer secondary winding to ground in response to the wink signal.

25 Claims, 4 Drawing Sheets

METHOD AND CIRCUIT FOR CROSS REGULATION IN A POWER CONVERTER

CROSS-REFERENCE TO RELATED APPLICATION

This application claims the benefit of the following Provisional application: 60/826,438 filed Sep. 21, 2006, which is expressly incorporated herein by reference.

TECHNICAL FIELD

The technical field relates in general to power converters, and more specifically to power converters with transformers or coupled inductors operating in a discontinuous conduction mode (DCM) of operation.

BACKGROUND

Power converters are used in a variety of situations, to convert voltages from one value or type to another. They can operate to convert an AC voltage to a DC voltage (e.g., a rectifier); to convert a DC voltage to a different DC voltage (e.g., a flyback converter); to convert an AC voltage to a different AC voltage (e.g., a frequency changer); or to convert a DC voltage into an AC voltage (e.g., an inverter). In its simplest form, a power converter includes a transformer with a main primary winding for receiving a power signal to be converted, and a main secondary winding for providing a converted power signal. But many power converter devices also include additional windings that provide additional converted power signals. Such additional windings can be primary windings or secondary windings, as required by the parameters of the device design.

Switched mode power converters, in particular, are often used since they are typically smaller, more efficient, and produce less heat than linear power converters. A switched-mode power converter runs a DC input signal through a high frequency power oscillator (e.g., implemented using a transformer). In such a power converter, the oscillation switching is typically implemented using a MOSFET switch connected between the main primary winding on the converter's transformer and ground. When the MOSFET switch is closed in a flyback converter, the current through the main primary coil of the transformer rises, increasing the energy stored in the transformer; and when the MOSFET switch is opened, the current through the main primary coil of the transformer decreases as the energy stored in the transformer is transferred to the outputs of the power converter.

One common multiple-output, switched mode power converter includes a main primary winding for receiving a power signal to be converted, a main secondary winding for providing a converted power signal to a load, and an additional primary winding for providing a power signal for a primary side controller (e.g., a primary side bias output). This primary side controller is the circuit that controls the operation of the MOSFET switch connected to the main primary winding. Other types of multiple-output power converters can also have additional secondary windings that provide additional converted power signals to additional loads.

Often a switched power converter will operate in a continuous conduction mode (CCM). In this operation mode the current through the main primary winding will rise when the MOSFET switch is closed and fall when the MOSFET switch is opened, but will never fall to zero. This will often occur during normal or high load operation for the device.

In order to conserve energy during light load operation of a switched mode power converter, however, the converter is allowed to enter into a discontinuous conduction mode (DCM) of operation. The DCM operation is characterized by a switching interval that is the result of natural commutation in an output rectifier stage caused by a diode or diodes preventing the reversal of current in a transformer or inductor. The DCM operation occurs naturally at sufficiently light loads for converters that have only diodes in their output rectification stage. Converters with synchronous rectifiers can only reach DCM if the load is sufficiently light and the synchronous rectifier is disabled. In DCM operation, the average switching frequency of a control MOSFET is often reduced to maintain high efficiency by reducing switching losses. The DCM operation is characterized by an interval where the inductive devices (i.e., the windings) in the switched mode power supply reach zero energy (i.e., the current passing through the windings drops to zero), and remain there until the next switching cycle.

But as the time increases during which a primary winding inductor is in a zero energy state, the cross regulation between the multiple outputs of the power supply worsens. Recognize that the only time that all of the outputs can be coupled is during intervals when there is energy stored in the magnetic field of the inductor or transformer. In flyback converters, the only interval that all of the outputs can be coupled is when energy is being passed from the transformer to the output capacitors. In other words, when the main primary winding in the power converter reaches zero energy, the voltages of the other windings begin to drift. Lighter loads and lower switching frequency cause the percentage of time that the outputs are coupled to become lower which will allow the output voltages to drift from a relationship that is defined by the turn ratio of their windings. This can be of particular concern when the voltages of the other windings are used to power specific circuits that require a certain minimum voltage to operate. In such cases, there is a danger that if the respective voltage drifts too low, it might provide insufficient power to a circuit, requiring it to shut down, enter a low power mode, or perhaps perform a reset function, thus reducing the operational efficiency of the circuit.

This can be of particular concern when one of the converted voltage outputs is used to power the primary side controller, which operates the MOSFET switch.

It would therefore be desirable to improve the cross-regulation of the converted power output voltages in a multiple-output power converter during a light load or discontinuous conduction mode of operation.

SUMMARY

Accordingly, one or more embodiments provide a power equalization circuit in a transformer-based device having a plurality of isolated voltage outputs. The power equalization circuit comprises: a threshold detection circuit configured to receive an error signal that is derived from a selected voltage at a selected one of the plurality of isolated voltage outputs, and configured to determine whether the selected voltage is above a voltage threshold based on the error signal; a timer circuit configured to activate a wait signal after a maximum voltage drift time has expired since the selected voltage was determined to have risen above the voltage threshold, and configured to activate a wink signal coincident with the wait signal; an overdrive current source configured to drive an error current to an overdriven value in response to the activation of the wait signal; and a commutator circuit connected to a transistor winding associated with the selected one of the plurality of isolated voltage outputs, the commutator being configured to connect the transformer winding to ground in response to the activation of the wink signal.

An alternate power equalization circuit in a transformer-based device having first through $N^{th}$ isolated voltage outputs, can also be provided, comprising: a threshold detection circuit configured to receive an error signal that is derived from a selected voltage at a selected one of first through Nth isolated voltage outputs, and configured to determine whether the selected voltage is above a voltage threshold based on the error signal; a timer circuit configured to generate a wait signal after a maximum voltage drift time has expired since the selected voltage was determined to have risen above the voltage threshold, and configured to generate a wink signal coincident with the wait signal; an overdrive current source configured to drive an error current to an overdriven value in response to the wait signal; and one or more commutator circuits, each connected to one of the first through Nth transistor windings associated with the first through Nth isolated voltage outputs, the one or more commutator circuits each being configured to connect one of the first through Nth transformer secondary winding to ground in response to the wink signal.

A power equalization method in a transformer-based device having a plurality of isolated voltage outputs can also be provided, comprising: receiving an error signal and an initial error current based on a measured voltage from one of the plurality of isolated voltage outputs; determining whether the measured voltage meets error threshold criteria; starting a drift timer when the measured voltage meets the error threshold criteria; determining when the drift time exceeds a maximum drift time; modifying the initial error current into a modified error current to indicate that a primary control MOSFET should be shut down when the drift time exceeds the maximum drift time; and equalizing output voltages at the plurality of isolated voltage outputs after modifying of the error current.

A device for equalizing power in a transformer-based device having a plurality of isolated voltage outputs can be provided, comprising: means for receiving an error voltage and an initial error current based on a measured voltage from one of the plurality of isolated voltage outputs; means for determining whether the error voltage meets error threshold criteria; means for starting a drift timer when the error voltage meets error threshold criteria; means for activating a wait signal when the drift time exceeds a maximum drift time; means for modifying the error current to indicate that a primary control MOSFET should be shut down in response to the activated wait signal; means for activating a wink signal in response to the activated wink signal; and means for equalizing output voltages at the plurality of isolated voltage outputs in response to the activated wink signal.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
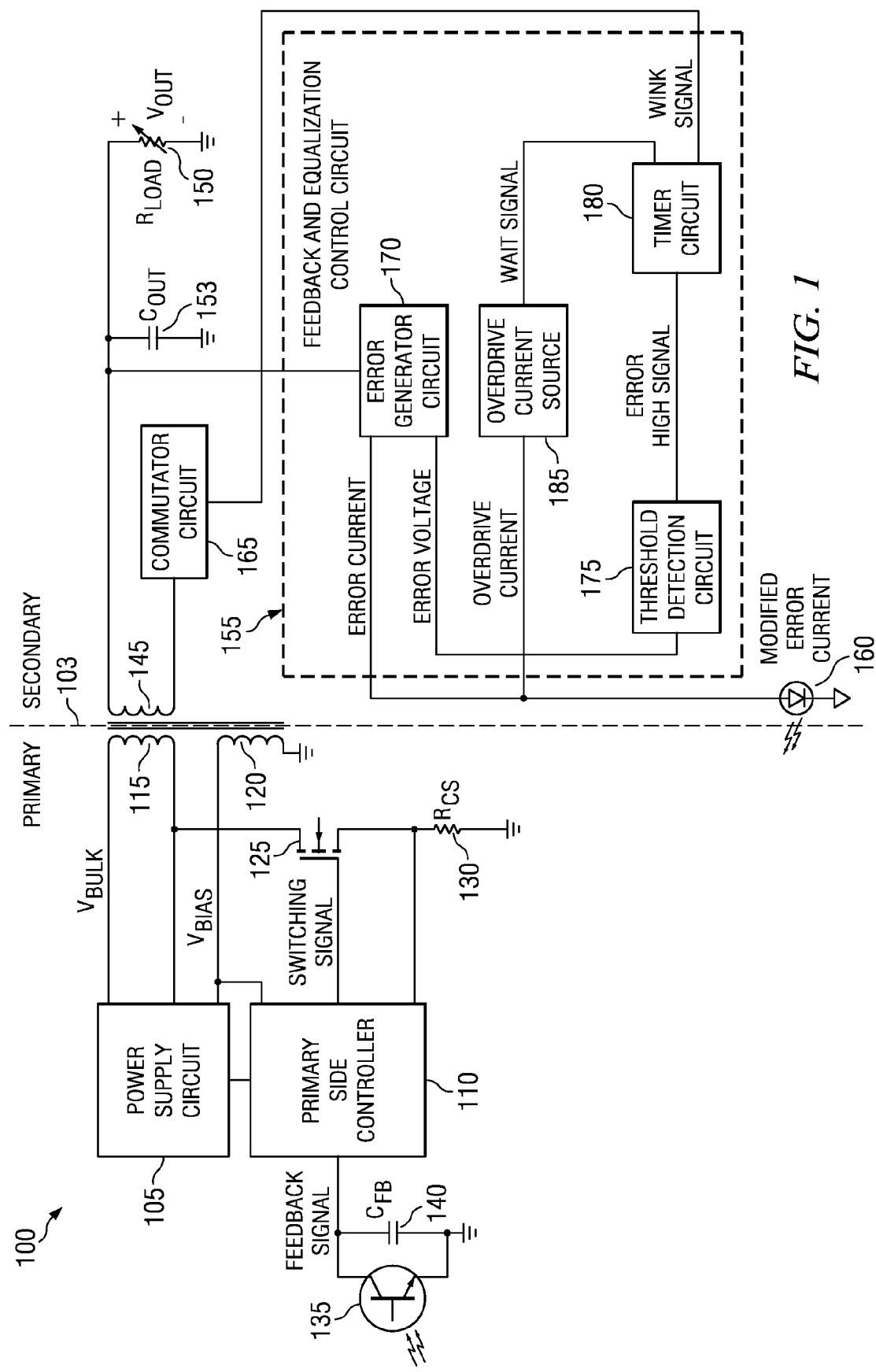
FIG. 1 is a diagram of a multiple-output power converter according to disclosed embodiments.

In overview, the present disclosure concerns multiple-output power supplies or power converters, particularly such power supplies or power converters that operate in a discontinuous conduction mode (DCM) of operation. More specifically, it relates to a circuit and related method for periodically equalizing or otherwise regulating the various output voltages in the power supply or power converter when they would otherwise drift more than would be desirable, e.g., during light load DCM operation. The method and circuit provide a way of both equalizing the output voltages and ensuring that the primary winding won't be activated during the equalization process.

The objective of equalizing the voltages is accomplished by instructing a commutator circuit connected to one or more secondary windings to connect that winding or windings to ground for a short time.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

In addition, although throughout the disclosure active signals are referred to as being high (i.e., having a value of "1"), and inactive signals are referred to as being low (i.e., having a value of "0"), this is by way of example only. Alternate embodiments may be used that employ active low and inactive high signals, and the circuits described below may be modified to account for such changes.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

As further discussed herein below, various inventive principles and combinations thereof are advantageously employed to reduce increase the amount of cross-regulation among power outputs of a switched-mode power converter, thereby reducing the maximum power drift across the power outputs.

Power Converter with a Single Secondary Winding

FIG. 1 is a diagram of a multiple-output power converter according to disclosed embodiments. In this particular embodiment the power converter is a switched-mode flyback converter. But it should be understood that the general concept can be applied to other types of switched-mode power converters.

As shown in FIG. 1, the power converter 100 includes a transformer 103 having a primary side and a secondary side. The primary side includes a power supply circuit 105, a primary side controller 110, a primary power supply winding 115, a primary bias winding 120, a MOSFET switch 125, a control resistor $R_{CS}$ 130, a phototransistor portion 135 of an optical isolator, and a feedback capacitor $C_{FB}$ 140. The secondary side includes a secondary power output winding 145, a load 150, an output capacitor $C_{OUT}$ 153, a feedback and equalization control circuit 155, a light-emitting diode (LED) portion 160 of an optical isolator, and a commutator circuit 165. The feedback and equalization control circuit 155 further includes an error generator circuit 170, a threshold detection circuit 175, a timer circuit 180, and an overdrive current source 185.

The power supply circuit 105 provides a bulk voltage $V_{BULK}$ to the primary power supply winding 115 to provide power for the primary bias winding 120 and the secondary power output 145. The power supply circuit may derive the bulk voltage $V_{BULK}$ from an AC or a DC current. The particular design of the power supply circuit would be well-known to one skilled in the art. Common designs will have the power supply circuit 105 also connected to the primary side controller 110, the primary bias winding 120, and primary MOSFET switch 125.

The primary side controller 110 is powered by a bias voltage $V_{BIAS}$ from the primary bias winding 120, and provides a switching signal to control the operation of the primary MOSFET switch 125. It receives a feedback signal from the phototransistor portion 135 of an optical isolator, which originates from the secondary side of the transformer 103, and uses that feedback signal, in part, to generate the switching signal. The particular design of a primary side controller 110 would be well known to one skilled in the art. In the disclosed embodiment, the feedback signal is an error current generated from an output voltage $V_{OUT}$ from the secondary power output winding 145 and passed across the transformer 103 through use of the optical isolator 135, 160.

The primary power supply winding 115 is connected between the bulk voltage $V_{BULK}$ it receives from the power supply circuit 105 and the primary MOSFET switch 125, which works as a switching regulator to operate the transformer 103 in a switched mode.

The primary bias winding 120 is arranged to provide a bias voltage $V_{BIAS}$ to run the primary side controller.

The primary MOSFET switch 125 is connected between the primary power supply winding 115 and the control resistor $R_{CS}$ 130, and is controlled by the switching signal received from the primary side controller. It functions as a switching regulator. In light load operation, during which the power converter 100 is in a discontinuous conduction mode (DCM), switching cycles may have a low frequency. As a result, the primary MOSFET switch 125 may be shut off (i.e., set in an open position) for an extended period of time between switching cycles.

The control resistor $R_{CS}$ 130 is connected between the primary MOSFET switch 125 and ground.

The phototransistor portion 135 of an optical isolator receives the error current (or modified error current) from the LED portion 160 of an optical isolator on the secondary side of the transformer 103, and uses it to generate the feedback signal to the primary side controller 110.

The feedback capacitor $C_{FB}$ 140 is connected in parallel with the phototransistor portion 135 of an optical isolator. In some embodiments, the feedback capacitor $C_{FB}$ 140 can be eliminated entirely.

Together, the elements on the primary side of the transformer 103 act to operate in a switched-mode to provide energy to the transformer 103. Such a switched-mode of operation would be well-known to one skilled in the art.

The secondary power output winding 145 is connected between the load 150 and the commutator circuit, and provides the output voltage $V_{OUT}$ to the load 150.

The load 150 contains a load and resistance receives the output voltage $V_{OUT}$.

The output capacitor $C_{OUT}$ 153 stores the output energy that results in the output voltage $V_{OUT}$, and serves to smooth out the output voltage $V_{OUT}$.

The feedback and equalization control circuit 155 receives the output voltage $V_{OUT}$ from the secondary power output winding 145, and uses this output voltage $V_{OUT}$ to generate an error current (or modified error current) indicative of when the primary MOSFET switch should be turned off, and a wink signal that controls when the commutator circuit should equalize the output power across all of the isolated outputs of the transformer 103.

The LED portion 160 of an optical isolator receives the error current (or modified error current) from the feedback and equalization control circuit 155, and passes it as an optical signal to the phototransistor portion 135 of an optical isolator on the primary side of the transformer 103.

The commutator circuit 165 operates in response to the wink signal, and performs an equalization process that equalizes the output power across all of the isolated outputs of the transformer 103. In particular, it takes the output voltage stored in the output capacitor $C_{OUT}$ 153 and shares it with the other output terminals. This operation will be described below in more detail with respect to FIGS. 4 and 5.

The specific operation of the elements within the feedback and equalization control circuit 155 will be described.

The error generator circuit 170 receives the output voltage $V_{OUT}$ from the secondary power output winding 145, and uses this output power to generate an error current and an error voltage that are indicative of the power level of the output voltage $V_{OUT}$. Typically, the error current and voltage represent an integrated value of the output voltage $V_{OUT}$ over time, such that power spikes can be averaged out. The generation of the error current and error voltage would be well-known to one of ordinary skill in the art.

The threshold detection circuit 175 receives a signal indicative of the level of the output voltage $V_{OUT}$, and uses that error signal to determine if the output voltage $V_{OUT}$ is above a set voltage threshold. In the disclosed embodiment, the threshold detection circuit 175 receives the error voltage from the error generation circuit and determines whether it exceeds a set error threshold. When the error voltage exceeds the error threshold, the threshold detection circuit 175 determines that the output voltage $V_{OUT}$ is also above its voltage threshold, and activates an error high signal to indicate this status. In alternate embodiments, however, a different error signal could be used to gauge the level of the output voltage $V_{OUT}$. In some embodiments the output current could be used. In others, a different measurement could be used. In some embodiments a direct measure of the output voltage $V_{OUT}$ could be used.

Alternate embodiments could use different criteria to determine when the output voltages have begun to drift. For example, in one alternate embodiment, the error current could be examined directly to see if it exceeded a current threshold, obviating the need for an error voltage altogether. Other threshold criteria are also possible.

The timer circuit 180 receives the error high signal and based on this signal generates the wink signal and a wait signal. As indicated above, the wink signal controls the operation of the commutator circuit 165, instructing it to perform an equalization process when the wink signal is set to be active. The wait signal indicates whether the primary MOSFET switch 125 should be forced off. An active wait signal indicates an equalization process is required and that the primary MOSFET switch 125 should be forced off to allow it to be safely performed; an inactive wait signal indicates that no equalization process is required and that the primary MOSFET switch 125 can continue to operate without interference.

The overdrive current source 185 generates an overdrive current that is added to the error current based on the wait signal received from the timer circuit. If the wait signal is inactive, then the overdrive current source 185 generates no overdrive current (i.e., the overdrive current is a null current). This allows the error current to pass unchanged, meaning that the modified error current is identical to the error current. But if the wait signal is active, then the overdrive current source 185 generates the overdrive current, which is added to the error current to create the modified error current.

The overdrive current is selected such that it guarantees that the modified error current will be of sufficient magnitude so that the phototransistor portion 135 of an optical isolator will generate a feedback signal that will instruct the primary side controller 110 to turn the primary MOSFET switch 125 off. Thus, regardless of the value of the error current, if the wait signal is active, the modified error current will indicate that the primary MOSFET switch 125 should be off.

Figure 2:
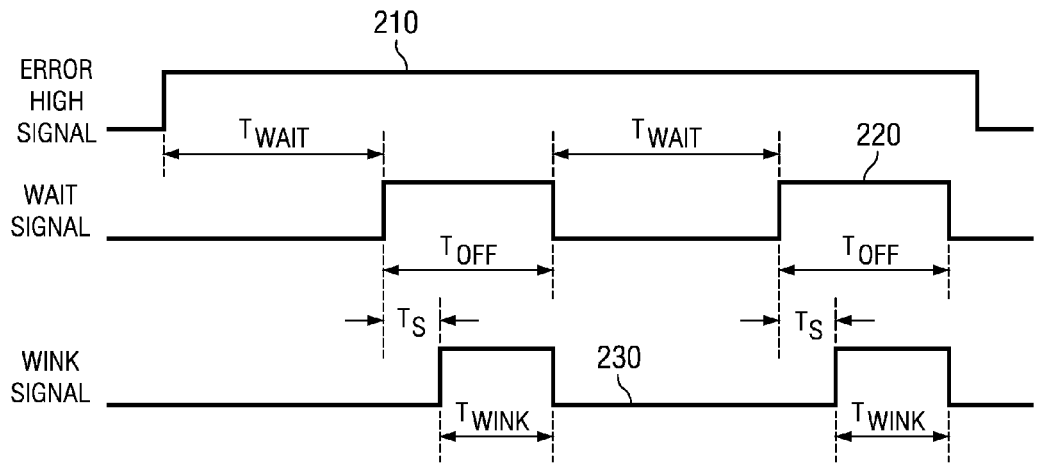
FIG. 2 is a graph of exemplary signals from the multiple-output power converter of FIG. 1 according to disclosed embodiments.

FIG. 2 is a graph of exemplary signals from the multiple-output power converter of FIG. 1, according to disclosed embodiments. As shown in FIG. 2, the timer circuit 180 receives the error high signal 210 and generates the wait signal 220 and the wink signal 230.

As noted above, the error high signal 210 in this embodiment becomes active (i.e., it goes high) when the error voltage rises above the threshold voltage stored in the threshold detection circuit 175. It remains high for as long as the error voltage stays above the threshold voltage.

The wait signal 220 becomes active (i.e., it goes high) a wait time $T_{WAIT}$ after the error high signal becomes active. The wait time $T_{WAIT}$ represents the time during which the primary input power winding is at a zero power level, and the output power values for the power converter are allowed to drift.

The wait signal remains active for an off time $T_{OFF}$, which represents the time during which the primary MOSFET switch 125 should remain off. In the disclosed embodiment, the wait signal is triggered inactive by the wink signal $T_{WINK}$ going inactive.

The wink signal $T_{WINK}$ becomes active (i.e., it goes high) a settling time $T_S$ after the wait signal $T_{WAIT}$ goes active. This settling time is selected to provide for the propagation of the modified error current to the primary side, the generation of an appropriate feedback signal by the phototransistor portion 135 of an optical isolator, and the shutting off of the primary MOSFET switch 125 in response to the feedback signal. In alternate embodiments the settling time could be reduced or even eliminated, though this will increase the possibility that the equalization process will be performed at a time when the primary MOSFET switch 125 is not switched off.

The wait time $T_{WAIT}$, settling time $T_S$, and wink time $T_{WINK}$ are selected based on the system parameters of the power converter and desired operational parameters. In the disclosed embodiments the wait time $T_{WAIT}$ is selected such that the power drift of the power outputs of the transformer 103 will remain within acceptable parameters; the settling time $T_S$ is selected to give the modified error current time to pass through to the primary side and the wink time $T_{WINK}$ is selected to provide a long enough equalization process such that the output power will remain within acceptable parameters for another wait time $T_{WAIT}$.

In the disclosed embodiment the wait time $T_{WAIT}$ is set to be about 15 msec, the settling time $T_S$ is set to be about 2 μsec, the wink time $T_{WINK}$ is set to be about 5 μsec, and the $T_{OFF}$ time is set to be about 7 μsec. In alternate embodiments, however, these time values can be varied. In some embodiments they can be set to be fixed values; in others some or all may be changeable under certain conditions.

Figure 3:
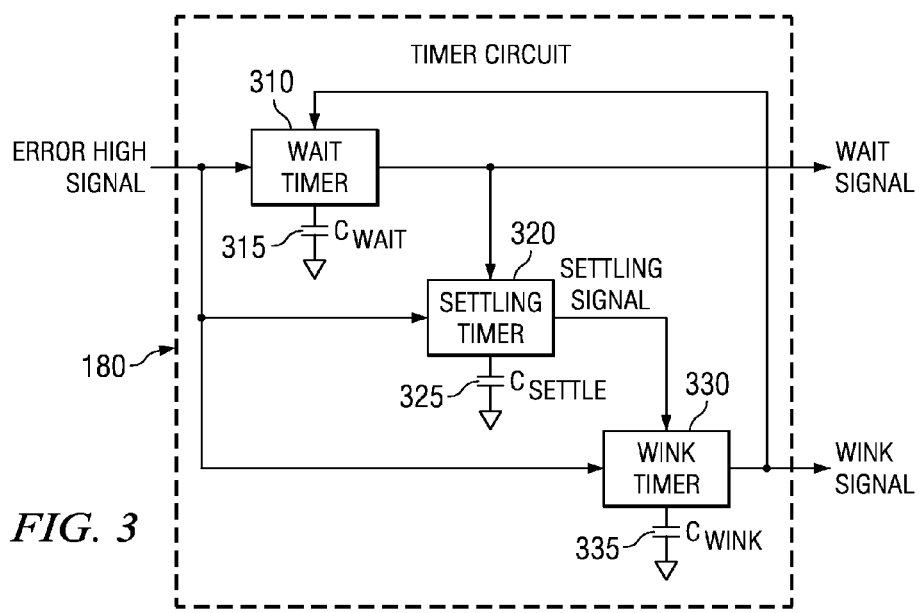
FIG. 3 is a block diagram illustrating an exemplary timer circuit, such as the timer circuit of FIG. 1, according to disclosed embodiments.

FIG. 3 is a block diagram illustrating an exemplary timer circuit, such as the timer circuit 180 of FIG. 1, according to disclosed embodiments. As shown in FIG. 3, the timer circuit 180 includes a wait timer 310, a wait capacitor $C_{WAIT}$ 315, a settling timer 320, a settling capacitor $C_{SETTLE}$ 325, a wink timer 330, and a wink capacitor $C_{WINK}$ 335.

The wait timer 310 receives the error high signal and the wink signal. It starts measuring the wait time $T_{WAIT}$ by charging the wait capacitor $C_{WAIT}$ 315 when the error high signal is activated, and sets the wait signal active if the error high signal is still active when the wait time $T_{WAIT}$ expires. It then sets the wait signal inactive when the wink signal goes inactive. At this time the wait time is reset to zero (e.g., the wait capacitor $C_{WAIT}$ is discharged). If the error high signal is still active at this point, the wait timer 310 will again start measuring the wait time to see if the wait signal needs to be reactivated.

The settling timer 320 receives the error high signal and the wait signal. It starts measuring the settling time $T_{SETTLE}$ by charging the settling capacitor $C_{SETTLE}$ 325 when it detects that the error high signal and the wait signal are both active. When the settling timer 320 determines that the settling time has passed (e.g., by charging the settling capacitor $C_{SETTLE}$ 325), it provides a settling signal to the wink timer indicating that it is safe to activate the wink signal.

The wink timer 330 receives the error high signal and the settling signal. It sets the wink signal active and starts measuring the wink time $T_{WINK}$ by charging the wink capacitor $C_{WINK}$ 335 when it receives the settling signal and detects that the error high signal is active. When the wink time $T_{WINK}$ is done, the wink timer sets the wink signal inactive.

In alternate embodiments, one or more of the capacitors 315, 325, and 335 could be removed and replaced with other timing mechanisms. For example, they could be replaced by software-driven timers, firmware-driven timers or any other desirable timing circuits.

In some alternate embodiments, the wait time $T_{WAIT}$ can be modulated either by a lower harmonic function or by frequency band limited random variations in order to spread the audio spectrum and reduce peak audio noise. This can be implemented by adding the modulating disturbance to the wait timer or with software in a digital implementation of the timer function. This combination is also compatible with synchronous rectification.

Figure 4:
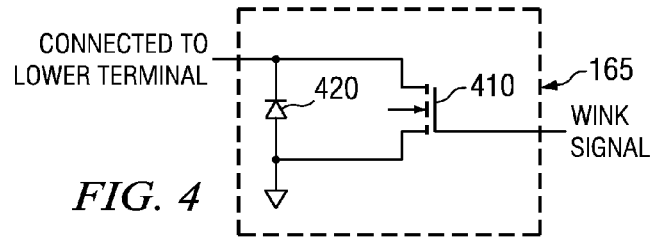
FIG. 4 is a block diagram illustrating an exemplary commutator circuit, such as the timer circuit of FIG. 1, according to disclosed embodiments.

FIG. 4 is a block diagram illustrating an exemplary commutator circuit, such as the commuter circuit 165 of FIG. 1, according to disclosed embodiments. As shown in FIG. 4, the commutator circuit 165 includes a MOSFET 410 and a rectifier diode 420. Diode 420 can be either a separate device than MOSFET 410 and/or a parasitic body diode that is common in MOSFET transistors.

The MOSFET 410 and the rectifier diode 420 are connected in parallel between a lower terminal of the secondary power output winding 145 and ground.

When the wink signal is active, the MOSFET 410 becomes conductive. This starts a power equalization process that causes energy to be passed from the output capacitance $C_{OUT}$ in the load 150 to other power supply outputs, such as the primary bias winding 120.

When the wink signal goes inactive, the MOSFET 410 is turned off and becomes non-conductive again. At this point, the MOSFET 410 and the rectifier diode 420 isolate the secondary power output 145 from ground and the equalization process stops.

Figure 5:
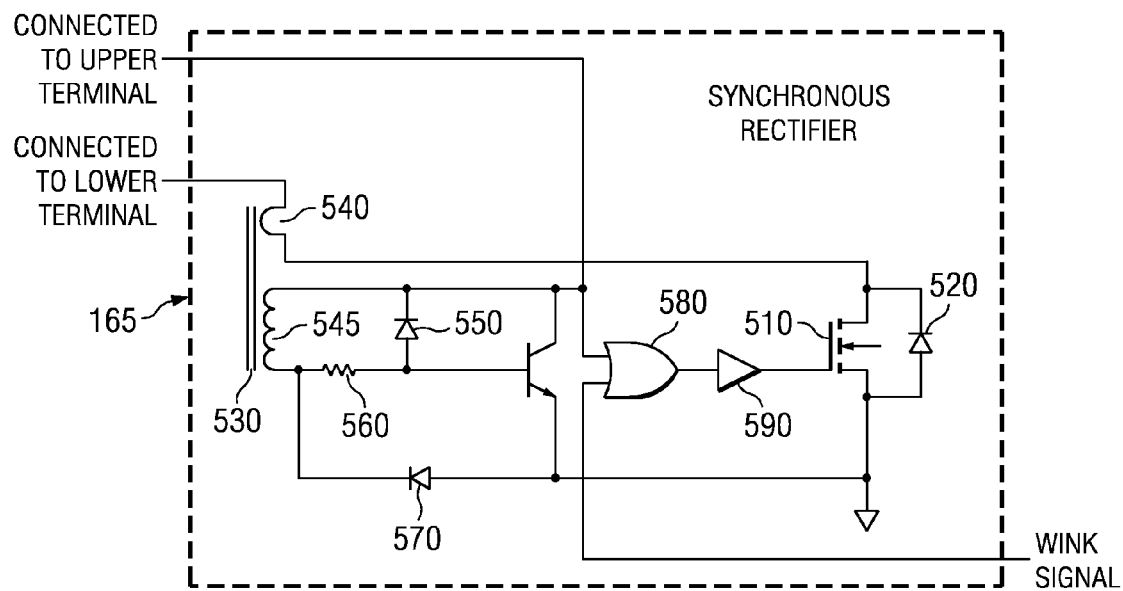
FIG. 5 is a block diagram illustrating an exemplary commutator circuit, such as the timer circuit of FIG. 1, that also functions as a synchronous rectifier according to disclosed embodiments.

FIG. 5 is a block diagram illustrating an exemplary commutator circuit, such as the commutator circuit 165 of FIG. 1, which also functions as a synchronous rectifier, according to disclosed embodiments. As shown in FIG. 5, the commutator circuit includes a MOSFET 510, a body diode 520, a current transformer core 530, a CT winding 540, a CT winding 545, a diode 550, a resistor 560, a diode 570, an OR gate 580, and an amplifier 590.

The MOSFET 510, a body diode 520, a current transformer core 530, a CT winding 540, a CT winding 545, a diode 550, a resistor 560, a diode 570, and an amplifier 590 operate as a synchronous rectifier in a manner known to one skilled in the art.

However, because the synchronous rectifier happens to include a MOSFET 510 and a diode 520 that are connected in parallel between a lower terminal of the secondary power output winding 145 and ground, this portion of the synchronous rectifier can operate as the commutator circuit 165. All that is required is the addition of the OR gate 580 to allow the MOSFET 510 to be controlled by either the synchronous rectifier circuitry or the wink signal.

The synchronous rectifier implementation of the commutation circuit 165 can be a self-driven design, as shown in FIG. 5, or could be a control-driven synchronous rectifier.

This dual use of a synchronous rectifier will typically not create any conflict since a synchronous rectifier is typically not needed during portions of the operation when the wink signal is likely to be active.

Power Converter with a Plurality of Secondary Windings

Although FIG. 1 discloses a power amplifier with a single primary side power input, a single primary side bias output, and a single secondary power output, this is by way of example only. Alternate embodiments could employ multiple power outputs on either the primary or the secondary side. Any or all of the outputs may have synchronous rectification. In such embodiments a single power output can be monitored or an average of multiple outputs can be monitored, with the results of that monitoring operation being used to control the commutator circuits in all of the secondary power outputs at the same time.

Figure 6:
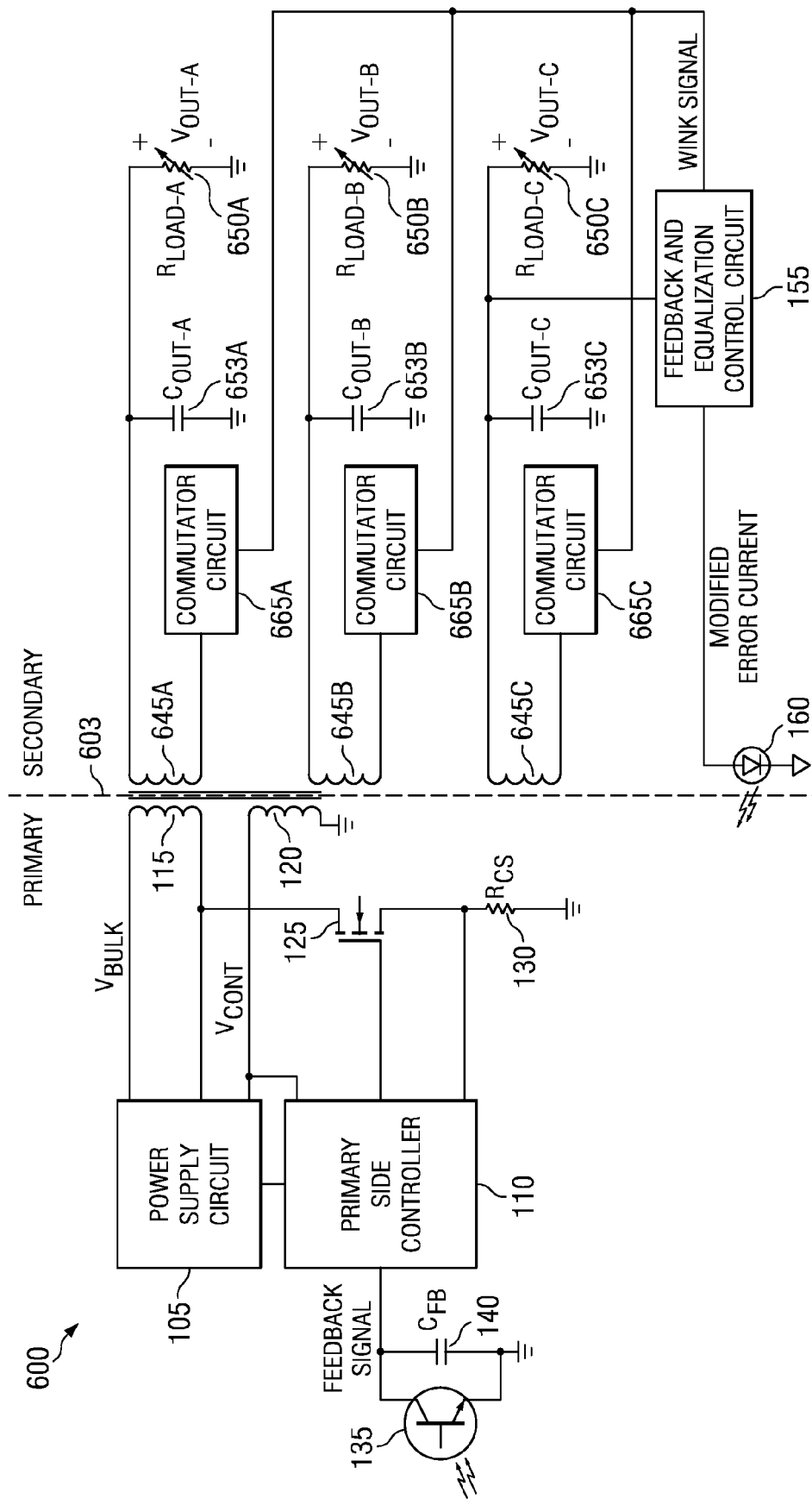
FIG. 6 is a diagram of a multiple-output power converter having a plurality of secondary windings according to disclosed embodiments.

FIG. 6 is a diagram of a multiple-output power converter having a plurality of secondary windings, according to disclosed embodiments. This shows an example in which a power converter has a single primary side power input, a single primary side bias output, and three secondary power outputs. It should be understood that this is by way of example only, and that the number of primary side bias outputs or secondary power outputs could vary in different embodiments.

As shown in FIG. 6, the power converter 600 includes a transformer 603 having a primary side and a secondary side. The primary side includes a power supply circuit 105, a primary side controller 110, a primary power supply winding 115, a primary bias winding 120, a MOSFET switch 125, a control resistor $R_{CS}$ 130, a phototransistor portion 135 of an optical isolator, and a feedback capacitor $C_{FB}$ 140. The secondary side includes secondary power output windings 645A, 645B, and 645C, loads $R_{OUT-A}$ 650A, $R_{OUT-B}$ 650B, and $R_{OUT-C}$ 650C, output capacitors $C_{OUT-A}$ 653A, $C_{OUT-C}$ 653B, and $C_{OUT-C}$ 653C, a feedback and equalization control circuit 155, an LED portion 160 of an optical isolator, and commutator circuits 665A, 665B, and 665C.

The power converter 600 operates substantially as shown above for the power converter 100 of FIG. 1. However in the power converter 600 of FIG. 6, the secondary side of the transformer 603 includes three secondary power output windings 645A, 645B, and 645C, three loads 650A, 650B, and 650C, and three commutator circuits 665A, 665B, and 665C.

The feedback and equalization control circuit 155 operates just as described with respect to FIG. 1, except that it picks one output voltage $V_{OUT-A}$, $V_{OUT-B}$, or $V_{OUT-C}$ from one of the secondary power output windings 645A, 645B, and 645C to base the generation of the error current (or modified error current) and the wink signal. In alternate embodiments, however, an average of one or more of the output voltages $V_{OUT-A}$, $V_{OUT-B}$, or $V_{OUT-C}$ can be used as an input to the feedback and equalization control circuit 155.

Furthermore, the wink signal is provided to all of the commutator circuits 665A, 665B, and 665C simultaneously so that the equalization process is performed on all of the secondary power output windings 645A, 645B, and 645C at the same time. However, in alternate embodiments, commutators could be provided at fewer than all of the secondary power output windings 645A, 645B, and 645C.

Power Regulation Operation

Figure 7:
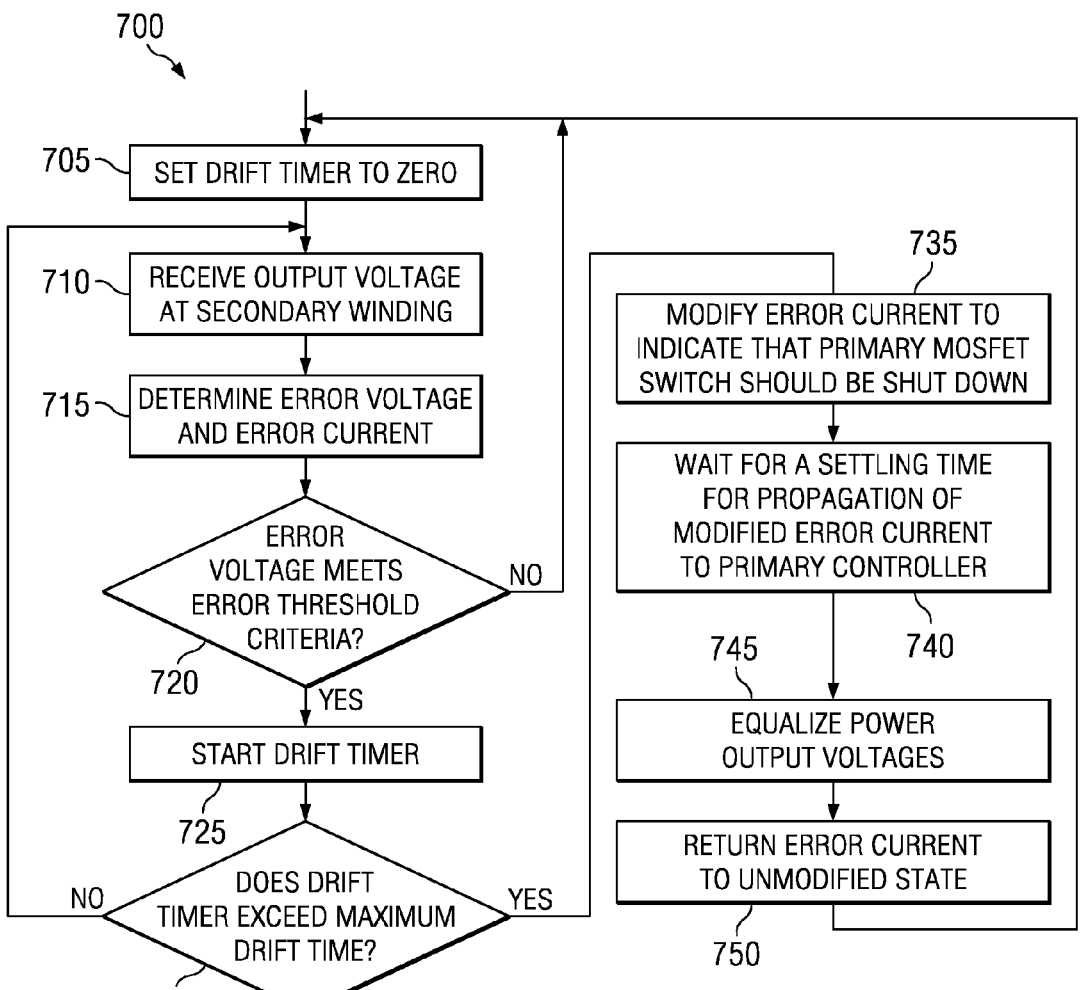
FIG. 7 is a flow chart illustrating an exemplary power regulation procedure according to disclosed embodiments.

FIG. 7 is a flow chart illustrating an exemplary power regulation procedure for a multiple output power converter according to disclosed embodiments. The procedure can be implemented on, for example, a power controller as described in connection with FIG. 1 or 6 or any other apparatus appropriately arranged.

As shown in FIG. 7, the power regulation process 700 begins by setting a drift timer to zero (705). This drift timer represents the amount of time that a primary power supply winding on a transformer in the power converter has been at zero power, i.e., the amount of time that the various output power values have been allowed to drift.

The power converter then receives an output voltage at a secondary winding of the transformer (710). If there are multiple output voltages at multiple secondary windings, then an appropriate output voltage is chosen to be monitored.

Based on the received output voltage, the power converter determines an error voltage and an error current (715). The determination of an error current is well known in the art, and methods for generating such an error current would be understood by one of skill in the art. An error voltage can easily be obtained by passing the error current across a known resistance.

The power converter then determines whether the error voltage meets certain error criteria (720). In one embodiment this can be accomplished by determining whether the error voltage exceeds a known threshold voltage that indicates that the primary power supply winding has reached zero power.

If the power converter determines that the error voltage does not meet the error criteria, then it makes certain that the drift counter remains at zero and continues to receive the output voltage, recalculate the error voltage, and monitor whether the error voltage meets the error threshold criteria (705-720).

If, however, the power converter determines that the error voltage does meet the error criteria, then it starts a drift timer going (725). This drift timer measures how long the primary power supply winding has been at zero power, and thus how long the output power values have been allowed to drift.

The power converter then determines whether the drift timer has exceeded a maximum allowable drift time, i.e., a maximum amount of time that the output power values will be allowed to drift (730). The exact duration of the maximum allowable drift time can be selected based on system parameters and desired system performance for the power converter. In some embodiments it may be a fixed value; in others it could be alterable in some circumstances.

If the power converter determines that the drift time has not exceeded the maximum allowable drift time, then it continues to receive the output voltage, recalculate the error voltage, monitor whether the error voltage meets the error threshold criteria, and maintains the drift timer (710-725). In this case, although element 725 refers to starting the drift timer, if it is repeated after the drift timer has been started, this operation simply involves making certain that the drift timer is still operating.

If, however, the power converter determines that the drift time does exceed the maximum allowable drift time, then it modifies the error current to indicate that the primary MOSFET switch should be shut down (735).

In many embodiments, a primary side controller receives the error current via an opto-isolator from the secondary side, and shuts down the primary MOSFET switch (i.e., sets it to open) when the error current rises above a certain current threshold. In such embodiments, the power converter can implement this operation by artificially overdriving the error current above this current threshold regardless of what the actual value of the error current would have been. This will ensure that for as long as the error current is modified, there is no danger of the primary MOSFET switch being turned on (i.e., set to closed).

In alternate embodiments in which an error current is not passed from the secondary side to the primary side, this operation could be altered such that whatever feedback signal is passed from the secondary side to the primary side controller would be altered to indicate that the primary MOSFET switch should be shut down.

Once the error current is modified, the power converter may wait for a settling time to allow the propagation of the modified error current to the primary side controller (740). This settling time allows the modified error current to be passed to the primary side and received by the primary side controller, for the primary side controller to shut down the primary MOSFET switch (if it was not shut down already). In one embodiment this time is on the order of 2 μsec. In alternate embodiments this waiting operation could be eliminated.

At this point, the power converter can safely equalize its various power output voltages (745). This can be achieved in any desired manner, including the use of a commutator circuit as noted above with respect to FIGS. 1 and 4-6.

Once the equalization process is completed, the power converter returns the error current to its unmodified state (750), sets the drift timer back to zero (705), and again begins monitoring the desired output voltage (710-730). In this case, should the error voltage continue to meet the error threshold criteria, the power converter can continue to perform an equalization process (745) whenever the maximum drift time passes since the last equalization process.

In this way, the power converter can improve cross regulation between primary power input and all of the power outputs, including a primary side bias output. And because the error current that is sent to the primary side controller is artificially overdriven to a large value, there is no danger that the primary MOSFET switch will inadvertently be activated.

CONCLUSION

It should be noted that the term power converter is used throughout the disclosure, the operations noted above are equally applicable to power converters and power supplies, along with any other sort of single power input/multiple power output device that employs a transformer.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A power equalization circuit in a transformer-based device having a plurality of isolated voltage outputs, comprising:

a threshold detection circuit configured to receive an error signal that is derived from a selected voltage at a selected one of the plurality of isolated voltage outputs, and configured to determine whether the selected voltage is above a voltage threshold based on the error signal;

a timer circuit configured to activate a wait signal after a maximum voltage drift time has expired since the selected voltage was determined to have risen above the voltage threshold, and configured to activate a wink signal coincident with the wait signal;

an overdrive current source configured to drive an error current to an overdriven value in response to the activation of the wait signal; and a commutator circuit connected to a transformer secondary winding associated with the selected one of the plurality of isolated voltage outputs, the commutator being configured to connect the transformer winding to ground in response to the activation of the wink signal.

2. The power equalization circuit of claim 1, wherein the error signal is one of an error voltage and the error current.

3. The power equalization circuit of claim 1, wherein when the overdrive current source drives the error current to the overdriven value, the error current continues to represent one of the actual error of the output voltage, and a timed average of the actual error of the output voltage.

4. The power equalization circuit of claim 1, wherein the wink signal is generated a settling time after the start of the wait signal.

5. The power equalization circuit of claim 1, wherein the commutator circuit comprises:
 a diode connected between the secondary winding and ground and configured to prevent current leakage from the secondary winding to ground; and
 a MOSFET transistor connected in parallel with the diode between the secondary winding and ground, and configured to become conductive in response to the activation of the wink signal.

6. The power equalization circuit of claim 1, wherein the commutator circuit comprises a synchronous rectifier.

7. The power equalization circuit of claim 1, wherein the timer circuit comprises:
 a wait timer configured to activate the wait signal after the maximum voltage drift time has expired since the selected voltage was determined to have risen above the voltage threshold;
 a settling timer configured to activate a settling signal after a settling time has expired since the activation of the wait signal; and
 a wink timer configured to activate the wink signal for a set wink time after the activation of the settling signal.

8. The power equalization circuit of claim 7, wherein the wait timer is further configured to deactivate the wait signal when the wink signal is deactivated.

9. The power equalization circuit of claim 1, wherein the timer circuit comprises one of a capacitor-based timing element and a software-based timing element.

10. The power equalization circuit of claim 1, further comprising an opto-coupler configured to transmit a value of the error current from a secondary transformer winding portion to a primary winding portion.

11. The power equalization circuit of claim 1, wherein the overdrive current source is shut off when the wait signal is inactive, and is configured to add an overdrive current to the error current when the wait signal is active.

12. A power equalization circuit in a transformer-based device having first through $N^{th}$ isolated voltage outputs, comprising:
 a threshold detection circuit configured to receive an error signal that is derived from a selected voltage at a selected one of first through $N^{th}$ isolated voltage outputs, and configured to determine whether the selected voltage is above a voltage threshold based on the error signal;
 a timer circuit configured to generate a wait signal after a maximum voltage drift time has expired since the selected voltage was determined to have risen above the voltage threshold, and configured to generate a wink signal coincident with the wait signal;
 an overdrive current source configured to drive an error current to an overdriven value in response to the wait signal; and
 one or more commutator circuits, each connected to one of first through $N^{th}$ transformer secondary windings associated with the first through $N^{th}$ isolated voltage outputs, the one or more commutator circuits each being configured to connect one of the first through $N^{th}$ transformer secondary windings to ground in response to the wink signal.

13. The power equalization circuit of claim 12, wherein the one or more commutator circuits comprises first through $N^{th}$ commutator circuits, respectively connected to first through $N^{th}$ transistor windings associated with the first through $N^{th}$ isolated voltage outputs, respectively, the first through $N^{th}$ commutator circuits each being configured to connect a respective one of the first through $N^{th}$ transformer secondary windings to ground in response to the wink signal.

14. The power equalization circuit of claim 12, wherein the error signal is derived from an average of the selected voltage and one or more additional voltages measured from one or more of the first through $N^{th}$ isolated voltage outputs.

15. The power equalization circuit of claim 12, wherein the commutator circuit comprises:
 a diode connected between the secondary winding and ground and configured to prevent current leakage from the secondary winding to ground; and
 a MOSFET transistor connected in parallel with the diode between the secondary winding and ground, and configured to become conductive in response to the activation of the wink signal.

16. The power equalization circuit of claim 12, wherein the timer circuit comprises one of a capacitor-based timing element and a software-based timing element.

17. The power equalization circuit of claim 12, wherein the overdrive current source is shut off when the wait signal is inactive, and is configured to add an overdrive current to the error current when the wait signal is active.

18. A power equalization method in a transformer-based device having a plurality of isolated voltage outputs, comprising:
 receiving an error signal and an initial error current based on a measured voltage from one of the plurality of isolated voltage outputs;
 determining whether the measured voltage meets error threshold criteria;
 starting a drift timer when the measured voltage meets the error threshold criteria;
 determining when the drift time exceeds a maximum drift time;
 modifying the initial error current into a modified error current to indicate that a primary control MOSFET should be shut down when the drift time exceeds the maximum drift time; and
 equalizing output voltages at the plurality of isolated voltage outputs after modifying of the error current.

19. The power equalization method of claim 18, wherein the error signal comprises one of an error voltage or the initial error current.

20. The power equalization method of claim 18, further comprising waiting a settling time after modifying the error current and before equalizing the output voltages.

21. The power equalization method of claim 18, further comprising returning the error current to an unmodified state after equalizing the output voltages.

22. The power equalization method of claim 18, wherein the error threshold criteria are met when the error voltage is above a set voltage threshold.

23. The power equalization method of claim 18, further comprising transmitting a value of the modified error current from a secondary transformer winding portion to a primary winding portion through the use of an optocoupling operation.

24. The power equalization method of claim 18, wherein the determining when the drift time exceeds a maximum drift time is performed using one of a capacitor charging operation, a capacitor discharging operation, or a software-driven delay operation.

25. A device for equalizing power in a transformer-based device having a plurality of isolated voltage outputs, comprising:

means for receiving an error voltage and an initial error current based on a measured voltage from one of the plurality of isolated voltage outputs;

means for determining whether the error voltage meets error threshold criteria;

means for starting a drift timer when the error voltage meets error threshold criteria;

means for activating a wait signal when the drift time exceeds a maximum drift time;

means for modifying the error current to indicate that a primary control MOSFET should be shut down in response to the activated wait signal;

means for activating a wink signal in response to the activated wink signal; and means for equalizing output voltages at the plurality of isolated voltage outputs in response to the activated wink signal.

\* \* \* \* \*